US010181056B2

(12) United States Patent
Gao et al.

(10) Patent No.: US 10,181,056 B2
(45) Date of Patent: Jan. 15, 2019

(54) PREVENTING DISPLAYING PRIVATE DATA BASED ON SECURITY POLICY

(71) Applicants: Beijing Lenovo Software Ltd., Beijing (CN); Lenovo (Beijing) Co., Ltd., Beijing (CN)

(72) Inventors: Feng Gao, Beijing (CN); Naibo Hong, Beijing (CN); Yanjun Tian, Beijing (CN)

(73) Assignees: Beijing Lenovo Software Ltd., Beijing (CN); Lenovo (Beijing) Co., Ltd., Beijing (CN)

( * ) Notice: Subject to any disclaimer, the term of this patent is extended or adjusted under 35 U.S.C. 154(b) by 67 days.

(21) Appl. No.: 14/230,181

(22) Filed: Mar. 31, 2014

(65) Prior Publication Data

US 2015/0026816 A1 Jan. 22, 2015

(30) Foreign Application Priority Data

Jul. 22, 2013 (CN) .......................... 2013 1 0308926

(51) Int. Cl.
 *G06F 21/60* (2013.01)
 *G06F 21/84* (2013.01)
 *G06F 21/62* (2013.01)

(52) U.S. Cl.
 CPC .......... *G06F 21/84* (2013.01); *G06F 21/6245* (2013.01); *G06F 21/60* (2013.01)

(58) Field of Classification Search
 CPC ..... H04L 9/32–9/3297; H04L 63/04–63/0492; H04L 63/08–63/0892;

(Continued)

(56) References Cited

U.S. PATENT DOCUMENTS

2004/0218036 A1* 11/2004 Boss ................. G06F 21/62
 348/14.08
2010/0223183 A1* 9/2010 Smith ............... G06F 21/34
 705/44

(Continued)

FOREIGN PATENT DOCUMENTS

WO WO 2013/098587 * 7/2013

OTHER PUBLICATIONS

WO 2013/098587 A1—AAD, Imad Title: Preventing Unintentionally Violating Privacy When Sharing and/or Publishing Content.*

(Continued)

*Primary Examiner* — Ashokkumar B Patel
*Assistant Examiner* — Quazi Farooqui
(74) *Attorney, Agent, or Firm* — Harness, Dickey & Pierce, P.L.C.

(57) ABSTRACT

The present invention discloses a display method and an electronic device. The method is applicable to an electronic device, the electronic device is capable of data transmission with a display device, the electronic device includes a first display unit, and the display device includes a second display unit; and the method includes: when the electronic device obtains information needing to be displayed, determining whether the information needing to be displayed is private information and generating a first determination result; in a case that the information needing to be displayed is private information, transmitting the information needing to be displayed to the first display unit only; and in a case that the information needing to be displayed is not private information, transmitting the information needing to be displayed at least to a second display unit.

8 Claims, 4 Drawing Sheets

(58) Field of Classification Search
CPC ........ H04L 63/126; G06F 21/30–21/46; G06F 21/60–21/645; G06F 9/00; G06F 21/84; G06F 21/6245; G06F 63/126; G06F 21/00; H04M 1/66
USPC ........... 726/26, 1–8; 713/168–176, 182–186, 713/202
See application file for complete search history.

(56) References Cited

U.S. PATENT DOCUMENTS

| | | | |
|---|---|---|---|
| 2013/0036462 A1* | 2/2013 | Krishnamurthi | G06F 21/32 726/19 |
| 2015/0113664 A1* | 4/2015 | Aad | G06K 9/00288 726/27 |

OTHER PUBLICATIONS

NPL search with inventive concept in Google Scholar. (Year: 2010).*

* cited by examiner

PREVENTING DISPLAYING PRIVATE DATA BASED ON SECURITY POLICY

CROSS REFERENCES OF RELATED APPLICATIONS

The present application claims the priority to Chinese Patent Application No. 201310308926.2, entitled "DISPLAY METHOD AND ELECTRONIC DEVICE", filed on Jul. 22, 2013 with the State Intellectual Property Office of People's Republic of China, which is incorporated herein by reference in its entirety.

FIELD

The present invention relates to the field of electronics and in particular to a display method and an electronic device.

BACKGROUND

Along with development of sciences and technologies, electronics also have gained rapid development. There are increasing types of electronic products, and people also have enjoyed various conveniences as a result of the development of sciences and technologies. Now people can enjoy a comfortable life brought by the development of sciences and technologies through various types of electronic devices. For example, a user can watch a movie, listen to music, play a game, etc., through a tablet computer, a smart phone or another electronic device, which have been widely applied due to their inherent advantage of portability.

Conventionally, people can have a notebook computer, a smart phone or another electronic device connected with a television set, a projector or another display device so that the display device can display contents on a display unit of the electronic device. For example, in some conference or speech scenario, a smart phone can be connected with a television set through Wireless Fidelity (WiFi) so that the smart phone transmits a conference or a speech displayed on a display unit to the television set and a large display screen of the television set presents information of the conference or the speech to other participants.

The inventors of this application have identified during making of a technical solution of embodiments of this application at least the following technical problem in the conventional technologies:

In the course of displaying, by the display device, the contents on the display unit of the electronic device, since the electronic device will transmit all the contents on the display unit to the display device, the display device will display all the contents in the electronic device accordingly.

In this case, even if some contents, which are undesirable for the user needing to be displayed on the display device, for example, which concern private information of the user, are displayed on the display unit of the electronic device, the display device will display the private information of the user, which may result in leakage of the private information.

In summary, conventionally there is such a technical problem that when information needing to be displayed by the electronic device is private information, the display device connected with the electronic device displays the information directly, which may result in leakage of the private information.

SUMMARY

Embodiments of this application provide a display method and electronic device to address the technical problem in the prior art that when information needing to be displayed, which is in an electronic device, is private information, a display device connected with the electronic device displays the information directly, which may result in leakage of the private information.

An aspect of the embodiments of this application provides a display method, applicable to an electronic device, where the electronic device is capable of data transmission with a display device, the electronic device includes a first display unit, and the display device includes a second display unit; and the method includes: when the electronic device obtains information needing to be displayed, determining whether the information needing to be displayed is private information and generating a first determination result; in a case that the first determination result indicates that the information needing to be displayed is private information, transmitting the information needing to be displayed to the first display unit only so that the first display unit displays the information needing to be displayed; and in a case that the first determination result indicates that the information needing to be displayed is not private information, transmitting the information needing to be displayed at least to the second display unit so that the second display unit displays the information needing to be displayed.

Optionally, in a case that the information needing to be displayed is information transmitted from a third electronic device connected with the electronic device, the determining whether the information needing to be displayed is private information includes one or any combination of: determining whether a contact of the information needing to be displayed is in a predetermined database of private contacts; determining whether a reception time of the information needing to be displayed is in a first predetermined range of time; and determining whether the information needing to be displayed is information displayed by an application in a predetermined list.

Optionally, in a case that the information needing to be displayed is information stored in the electronic device, the determining whether the information needing to be displayed is private information includes one or any combination of: determining whether the information needing to be displayed is in a private status; determining whether a creation time of the information needing to be displayed is in a second predetermined range of time; and determining whether the information needing to be displayed is alert information.

Optionally, the method further includes: updating at a predetermined period an operation to be performed in determination of whether the information needing to be displayed is private information.

Optionally, the transmitting the display information at least to the second display unit includes: transmitting the display information to the second display unit so that the second display unit displays the information needing to be displayed; or transmitting the display information to the first display unit and the second display unit so that both the first display unit and the second display unit display the information needing to be displayed.

In another aspect, an embodiment of this application further provides an electronic device, wherein the electronic device includes: a first display unit; an obtaining unit configured to obtain information needing to be displayed; a determining unit configured to determine whether the information needing to be displayed is private information and to generate a first determination result; a first transmitting unit configured, in a case that the first determination result indicates that the information needing to be displayed is private information, to transmit the information needing to be displayed to the first display unit only so that the first display unit displays the information needing to be displayed; and a second transmitting unit configured, in a case that the first determination result indicates that the information needing to be displayed is not private information, to transmit the information needing to be displayed at least to a second display unit of a display device capable of data transmission with the electronic device so that the second display unit displays the information needing to be displayed.

Optionally, in a case that the information needing to be displayed is information transmitted from a third electronic device connected with the electronic device, the determining unit performs one or any combination of: determining whether a contact of the information needing to be displayed is in a predetermined database of private contacts; determining whether a reception time of the information needing to be displayed is in a first predetermined range of time; and determining whether the information needing to be displayed is information displayed by an application in a predetermined list.

Optionally, in a case that the information needing to be displayed is information stored in a storage unit of the electronic device, the determining unit performs one or any combination of: determining whether the information needing to be displayed is in a private status; determining whether a creation time of the information needing to be displayed is in a second predetermined range of time; and determining whether the information needing to be displayed is alert information.

Optionally, the electronic device further includes: a processing unit configured to update at a predetermined period an operation to be performed in determination of whether the information needing to be displayed is private information.

Optionally, the second transmitting unit is further configured: to transmit the display information to the second display unit so that the second display unit displays the information needing to be displayed; or to transmit the display information to the first display unit and the second display unit so that both the first display unit and the second display unit display the information needing to be displayed.

One or more of the technical solutions according to the embodiments of the invention have at least the following technical effects or advantages:

When the electronic device obtains information needing to be displayed, it is determined whether the information needing to be displayed is private information, and a first determination result is generated; and in a case that the first determination result indicates that the information needing to be displayed is private information, the information needing to be displayed is transmitted to the first display unit only so that the first display unit displays the information needing to be displayed; and in a case that the first determination result indicates that the information needing to be displayed is not private information, the information needing to be displayed is transmitted at least to the second display unit so that the second display unit displays the information needing to be displayed. That is, in a case that the information needing to be displayed is private information, the information needing to be displayed is transmitted to the first display unit of the electronic device only but not transmitted to the second display unit of the display device so that the private information is displayed only on the first display unit but not displayed on the second display unit, thereby addressing effectively the technical problem in the prior art that the display device connected with the electronic device displays the private information directly, which may result in leakage of the private information, and enhancing the security of displaying on the display device the information needing to be displayed, which is in the electronic device.

Furthermore, since the electronic device and the display device can be connected wirelessly, this connection mode is not limited by a connection wire, and therefore the use range is extended.

Still furthermore, since whether information needing to be displayed is private information can be determined under an adaptive criterion according to the type of the information needing to be displayed, for example, interactive information or local information, the use range can be further extended.

Particularly, when the information needing to be displayed is information transmitted from a third electronic device connected with the electronic device, for example, interactive information, the determination of whether the information needing to be displayed is private information includes one or any combination of: determining whether a contact of the information needing to be displayed is in a predetermined database of private contacts; determining whether a reception time of the information needing to be displayed is in a first predetermined range of time; and determining whether the information needing to be displayed is information displayed by an application in a predetermined list. Hence, in a case that the information needing to be displayed is interactive information, the determination of whether the information needing to be displayed is private information can be diversified to further extend the use range.

Particularly, in a case that the information needing to be displayed is information stored in the electronic device, for example, local information, the determination of whether the information needing to be displayed is private information includes one or any combination of: determining whether a creation time of the information needing to be displayed is in a second predetermined range of time; and determining whether the information needing to be displayed is alert information. Hence, in a case that the information needing to be displayed is local information, the determination of whether the information needing to be displayed is private information can be diversified to further extend the use range.

Still furthermore, since the operation to be performed in determination of whether the information needing to be displayed is private information can be updated at a predetermined period, the operation of determining whether the information needing to be displayed is private information can be updated in real-time to enhance the accuracy of the determination.

Still furthermore, in a case that the first determining result indicates that the information needing to be displayed is not the private information, the information needing to be displayed can be transmitted to the second display unit, or the information needing to be displayed can be transmitted to the first display unit and the second display unit, so that the information needing to be displayed can be displayed only on the second display unit of the display device alone or can be displayed on both the first display unit of the electronic device and the second display unit of the display device, so that in a case that the information needing to be displayed is not private information, the display of the information needing to be displayed can be diversified to still further extend the use range.

DETAILED DESCRIPTION

Embodiments of this application provide a display method and electronic device to address the technical problem in the prior art that when information of an electronic device, which needs to be displayed, is private information, a display device connected with the electronic device displays the information directly, which may result in leakage of the private information.

In order to address the foregoing problem, a general idea of a technical solution according to an embodiment of the invention is as follows:

When an electronic device obtains information needing to be displayed, it is determined whether the information needing to be displayed is private information, and a first determination result is generated; and when the first determination result indicates that the information needing to be displayed is private information, the information needing to be displayed is transmitted only to a first display unit so that the first display unit displays the information needing to be displayed; and when the first determination result indicates that the information needing to be displayed is not private information, the information needing to be displayed is transmitted at least to a second display unit so that the second display unit displays the information needing to be displayed. That is, when the information needing to be displayed is private information, the information needing to be displayed is transmitted to the first display unit of the electronic device only but not transmitted to the second display unit of a display device, so that the private information is displayed only on the first display unit but not displayed on the second display unit, thereby addressing effectively the technical problem in the prior art that the display device connected with the electronic device displays the private information directly, which may result in leakage of the private information, and enhancing the security in displaying on the display device the information needing to be displayed, which in the electronic device.

Furthermore the electronic device and the display device can be connected wirelessly, and this connection mode is not limited by a connection wire and the use range is extended.

For better understanding, the foregoing technical solution will be detailed below with reference to the drawings of the disclosure and particular embodiments thereof.

This embodiment provides a display method applicable to an electronic device. The electronic device is capable of data transmission with a display device, where the electronic device includes a first display unit, and the display device includes a second display unit. In a particular application, the electronic device may be a smart phone, a table computer, a notebook computer, etc., and the display device may be a television set, a projector, etc., and the electronic device and the display device may be in wireless connection, for example, through Bluetooth, WiFi, etc., or may be in wired connection, for example, over a multimedia transmission line for data transmission, which will not be enumerated here.

The display method according to the embodiment of the invention will be detailed below with reference to FIG. 1.

Step 101: when an electronic device obtains information needing to be displayed, it is determined whether the information needing to be displayed is private information, and a first determination result is generated;

Step 102: when the first determination result indicates that the information needing to be displayed is private information, the information needing to be displayed is transmitted only to a first display unit so that the first display unit displays the information needing to be displayed; and Step 103: when the first determination result indicates that the information needing to be displayed is not private information, the information needing to be displayed is transmitted at least to a second display unit so that the second display unit displays the information needing to be displayed.

In order to further clarify an implementation of the display method according to the embodiment of this application, a process of the display method according to the embodiment of this application will be detailed below by way of an example in which the electronic device is a smart phone A, and the display device is a television set, where the smart phone A includes a small display screen, and the television set includes a large display screen, and the electronic device and the display device are connected wirelessly.

In a conference scenario, a user needs to display information needing to be displayed, which is stored in the smart phone A, to participants through the large display screen of the television set. Then the user connects the smart phone A with the television set wirelessly, for example, through WiFi. At this time the step 101 is performed: when the electronic device obtains information needing to be displayed, it is determined whether the information needing to be displayed is private information, and a first determination result is generated.

In a particular implementation of the step 101, for example, the smart phone A determines whether the information needing to be displayed is private information and generates a first determination result. When the information needing to be displayed is private information, the first determination result can show that the information needing to be displayed is private information; and when the information needing to be displayed is not private information, the first determination result can show that the information needing to be displayed is not private information.

The display method according to the embodiment of the invention proceeds to the step 102 or the step 103 according to the first determination result generated in the step 101.

Step 102: when the first determination result indicates that the information needing to be displayed is private information, the information needing to be displayed is transmitted to the first display unit only, so that the first display unit displays the information needing to be displayed.

In a particular implementation of the step 102, for example, when the first determination result generated by the smart phone A indicates that the information needing to be displayed is private information, the smart phone A adds a privacy identifier to the private information, and the smart phone A transmits the private information only to the small display screen of the smart phone A based on the privacy identifier, so that the small display screen displays the private information. In this way, the technical problem in the prior art of leaking the private information can be avoided effectively, and the security of displaying the private information can be enhanced.

Step 103: when the first determination result indicates that the information needing to be displayed is not private information, the information needing to be displayed is transmitted at least to the second display unit so that the second display unit displays the information needing to be displayed. Particularly, the information needing to be displayed is transmitted to the second display unit so that the second display unit displays the information needing to be displayed; or the information needing to be displayed is transmitted to the first display unit and the second display unit so that both the first display unit and the second display unit display the information needing to be displayed.

In a particular implementation of the step 103, for example, when the first determination result indicates that the information needing to be displayed is not private information, the information needing to be displayed is transmitted only to the large display screen of the television set so that participants may get the information needing to be displayed. Or when the first determination result indicates that the information needing to be displayed is not private information, the information needing to be displayed is transmitted to the small display screen of the smart phone A and the large display screen of the television set so that the information needing to be displayed can be displayed on both the small display screen of the smart phone A and the large display screen of the television set, to diversify the display of the information needing to be displayed and still further extend the use range.

In order to update in real-time the operation for the determination with regard to the information needing to be displayed and enhance the accuracy of determining private information, the method according to the embodiment of this application further the step of updating at a predetermined period the operation to be performed in determination of whether the information needing to be displayed is private information.

In a particular implementation, for example, the operation to be performed in the smart phone in determination of whether the information needing to be displayed is private information is updated at a period of 24 hours. Of course, the period can be adjusted in response to a practical demand, and this application is not limited in this respect.

Figure 1:
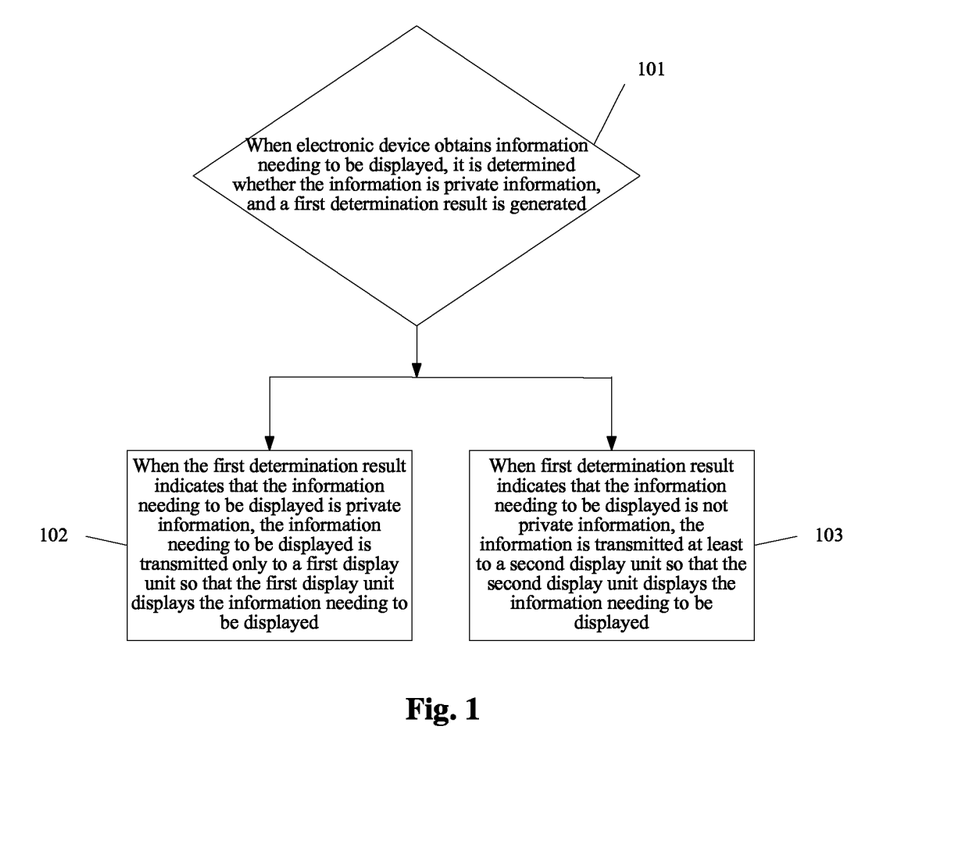
FIG. 1 is a flow chart of a display method according to an embodiment of this application.

Still referring to FIG. 1, since different types of information needing to be displayed correspond to different determination criterions in the step 101, in order to determine whether information needing to be displayed is private information under an adaptive criterion according to the type of the information needing to be displayed, for example, interactive information or local information, to further extend the use range, the method in the embodiment of the invention may be implemented as the following two embodiments. In a first embodiment, referring to both FIG. 1 and FIG. 2, the step 101 is particularly implemented as the step 1011 relating to a criterion for determining whether the interactive information is private information; and in a second embodiment, referring to both FIG. 3 and FIG. 4, the step 101 is particularly implemented as the step 1012 relating to a criterion for determining whether local information is private information. These two embodiments will be introduced below respectively.

Figure 2:
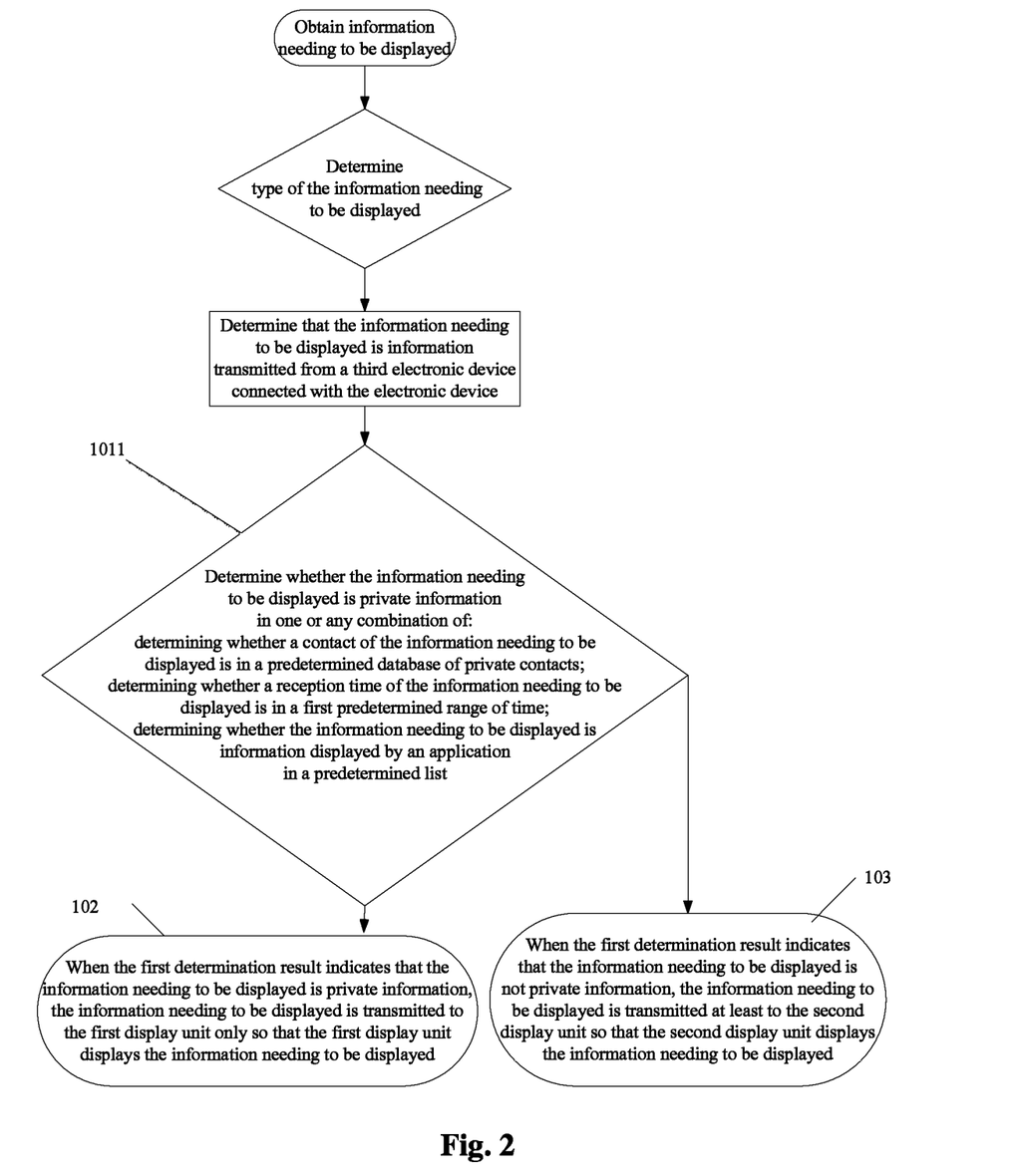
FIG. 2 is a flow chart of a display method according to a first embodiment of this application.

In the first embodiment, information needing to be displayed is information transmitted from a third electronic device connected with an electronic device, that is, interactive information. Referring to FIG. 2, the first embodiment of this application will introduce a criterion for determining whether the information needing to be displayed is private information when the third electronic device is a smart phone B and the information needing to be displayed is interactive information. The determination of whether interactive information is private information can be performed by one or any combination of the following operations.

In a first operation, it is determined whether a contact of the information needing to be displayed is in a predetermined database of private contacts.

For example, when the smart phone A receives a short message transmitted from the smart phone B, it is determined whether a contact who initiates the short message is in a predetermined database of private contacts. When the contact who initiates the short message is in the predetermined database of private contacts, the process proceeds to the step 102; otherwise, the process proceeds to the step 103. The database of contacts is a database of private contacts predetermined in the smart phone A, and adding, modifying and/or canceling of a private contact may be performed for the database or a contact in a list of contacts in the smart phone can be added by default to the database of private contacts as desirable by a user, and this application is not limited in this respect.

Of course, in another embodiment of this application, the interactive information may alternatively be an incoming call request, an e-mail, a multimedia message, etc., and this application is not limited in this respect.

In a second operation, it is determined whether a reception time of the information needing to be displayed is in a first predetermined range of time.

For example, when the interactive information is a short message, it is determined whether a reception time of the short message is in a first predetermined range of time, for example, from Apr. 1, 2013 to May 1, 2013, and when the reception time of the short message is in this range of time, the process proceeds to the step 102; otherwise, the process proceeds to the step 103.

Of course, in another embodiment of this application, the first predetermined range of time can be adjusted flexibly as desirable in practice. A length of the range, a minimum unit of the time, a starting time and an ending time of the first predetermined range of time may be adjusted. For example, the first predetermined range of time can be adjusted to 12:00 on Feb. 1, 2013 to 12:00 on Mar. 1, 2013. This application is not limited in this respect.

In a third operation, it is determined whether the information needing to be displayed is information displayed by an application in a predetermined list.

For example, when the smart phone A receives an instant message, for example, MSN message or QQ message, transmitted from the smart phone B, the smart phone A determines whether an application initiating the instant message, i.e., MSN chatting application or QQ charting application in this example, is in a list of applications stored in the smart phone A. Applications included in the list of applications may be added by the use to the list of applications. For example, a game application, a presentation application and a QQ chatting application are present in the smart phone A, and the presentation application is in the list of applications.

When the application initiating the instant message, which is the QQ chatting application, is in the list of applications, the process proceeds to the step 102; otherwise, the process proceeds to the step 103.

Moreover when the information needing to be displayed is interactive information, the interactive information can be defaulted directly as private information, and the method in the embodiment of this application proceeds directly to the step 102.

In a particular implementation, for example, the process proceeds directly to the step 102 as long as the contents needing to be displayed, which are received by the smart phone, are interactive information.

In order to update in real-time the operation for the determination with regard to the information needing to be displayed and enhance the accuracy of determining whether the information needing to be displayed is private information, the first embodiment for the embodiment of this application further includes the step of updating at a predetermined period the operation to be performed in determination of whether the information needing to be displayed is private information.

In a particular implementation, for example, the operation to be performed by the smart phone in determination of whether the information needing to be displayed is private information is updated at a period of 24 hours. Of course, the period can be adjusted as desirable in practice, and this application is not limited in this respect.

Figure 3:
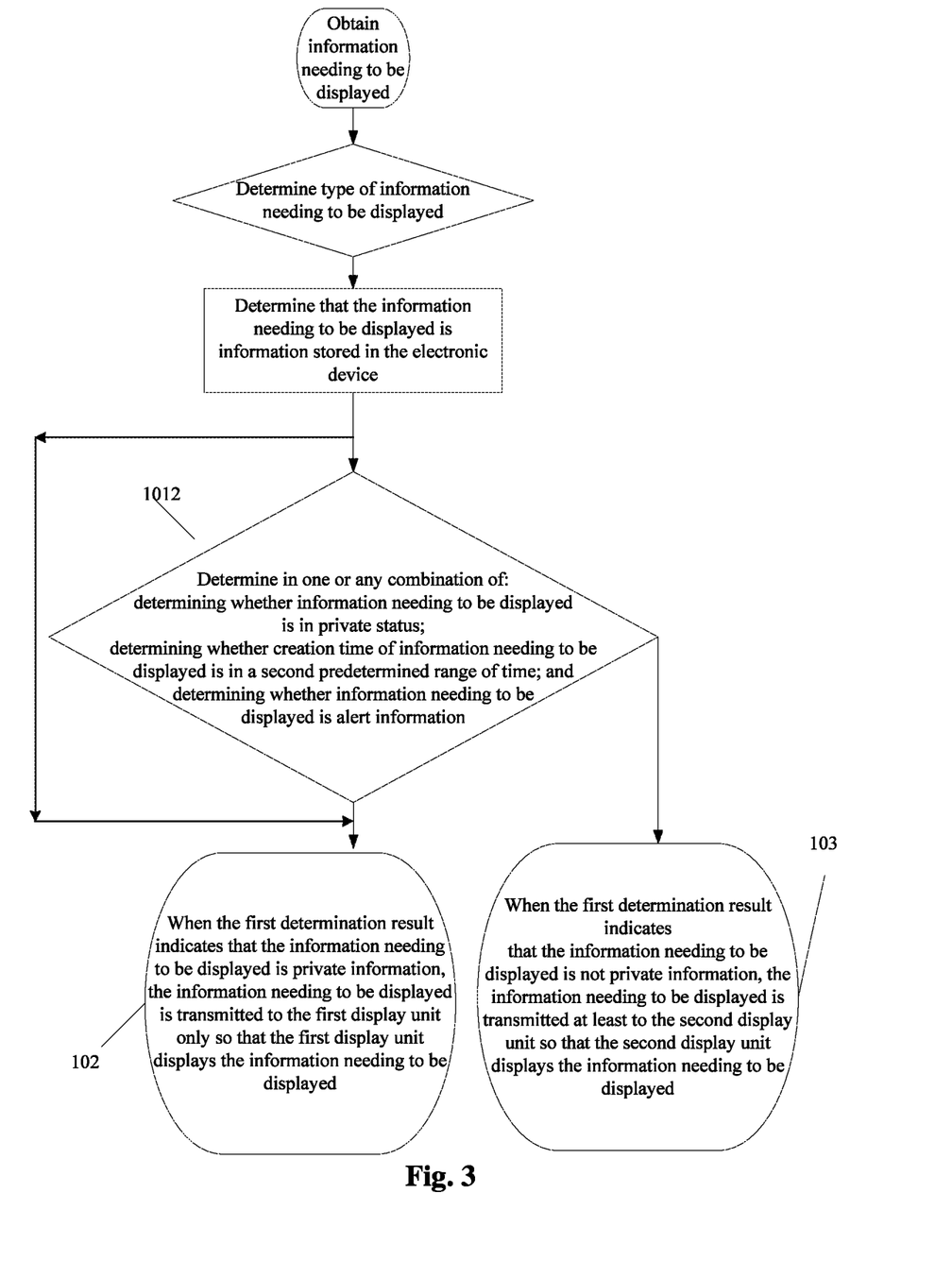
FIG. 3 is a flow chart of a display method according to a second embodiment of this application.

In the second embodiment, the information needing to be displayed is information stored in the electronic device, that is, local information. Referring to FIG. 3, the second embodiment of this application will introduce a criterion for determining whether the information needing to be displayed is private information when the information needing to be displayed is local information, where whether local information is private information can be determined in one or any combination of the following operations.

In a first operation, it is determined whether the information needing to be displayed is in a private status.

Continuing with the previous embodiment, when the user opens a locally stored picture in the course of showing conference materials, the smart phone A determines whether the picture is predetermined as in a private status by the user, and when the picture is in a private status, the process proceeds to the step 102; otherwise, the process proceeds to the step 103.

In a second operation, it is determined whether a creation time of the information needing to be displayed is in a second predetermined range of time.

Continuing with the previous embodiment, when the user opens a locally stored document in the course of showing conference materials, the smart phone A determines whether a creation time of the document is in a second predetermined range of time, for example, from Jan. 1, 2013 to Jan. 1, 2014, and when the creation time of the document falls into the scope of Jan. 1, 2013 to Jan. 1, 2014, then the process proceeds to the step 102; otherwise, the process proceeds to the step 103. The second predetermined range of time can be adjusted flexibly as desirable in practice. A length of the range, a minimum unit of the time, a starting time and an ending time of the first predetermined range of time may be adjusted. For example, the second predetermined range of time can be adjusted to 12:00 on Feb. 1, 2012 to 12:00 on Mar. 1, 2013.

In a third operation, it is determined whether the information needing to be displayed is alert information.

For example, when the user is showing conference materials, an alarm predetermined by the user needs to be displayed, and the smart phone A determines whether the alarm is alert information, and if so, then the process proceeds to the step 102; otherwise, the process proceeds to the step 103. The alert information may be alert information for to-do list, alert information for appointment, etc., and this application is not limited in this respect.

In order to update in real-time the operation for the determination with regard to the information needing to be displayed and enhance the accuracy of determining whether the information needing to be displayed is private information, the second embodiment for the embodiment of this application further includes the step of updating at a predetermined period the operation to be performed in determination of whether the information needing to be displayed is private information.

In a particular implementation, for example, the operation to be performed by the smart phone in determination of whether the information needing to be displayed is private information is updated at a period of 24 hours. Of course, the period can be adjusted as desirable in practice, and this application is not limited in this respect.

Figure 4:
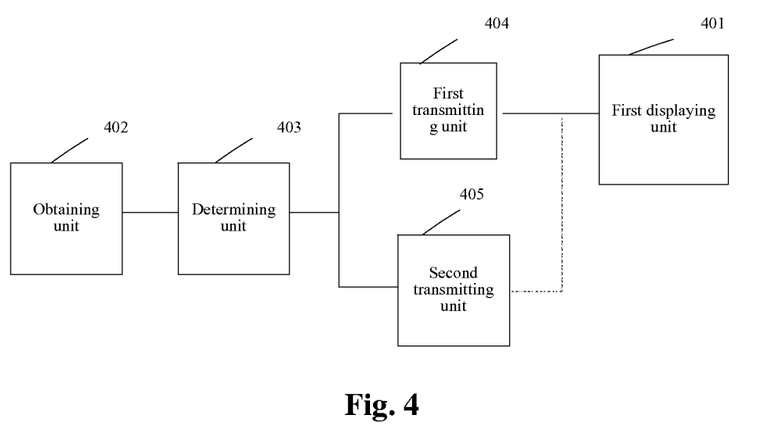
FIG. 4 is an architectural diagram of an electronic device according to an embodiment of this application.

Another embodiment of this application provides an electronic device for performing the display method in FIG. 1 and the particular embodiments thereof, and reference is made to FIG. 4 which is an architectural diagram of the electronic device according to this embodiment.

As illustrated in FIG. 4, this embodiment provides an electronic device. The electronic device includes: a first display unit 021; an obtaining unit 202 configured to obtain information needing to be displayed; a determining unit 203 configured to determine whether the information needing to be displayed is private information and to generate a first determination result; a first transmitting unit 204 configured, when the first determination result indicates that the information needing to be displayed is private information, to transmit the information needing to be displayed to the first display unit only 201 so that the first display unit 201 displays the information needing to be displayed; and a second transmitting unit 205 configured, when the first determination result indicates that the information needing to be displayed is not private information, to transmit the information needing to be displayed at least to a second display unit of a display device capable of data transmission with the electronic device so that the second display unit displays the information needing to be displayed.

Optionally, when the information needing to be displayed is information transmitted from a third electronic device connected with the electronic device, the determining unit 203 performs one or any combination of: determining whether a contact of the information needing to be displayed is in a predetermined database of private contacts; and determining whether a reception time of the information needing to be displayed is in a first predetermined range of time.

Optionally, when the information needing to be displayed is information stored in a storage unit of the electronic device, the determining unit 203 performs one or any combination of the following operation of: determining whether the information needing to be displayed is in a private status; determining whether a creation time of the information needing to be displayed is in a second predetermined range of time; and determining whether the information needing to be displayed is alert information.

Optionally, the electronic device further includes: a processing unit configured to update at a predetermined period the operation to be performed in determination of whether the information needing to be displayed is private information.

Optionally, the second transmitting unit 205 is particularly configured to: transmit the information needing to be displayed to the second display unit so that the second display unit displays the information needing to be displayed; or transmit the information needing to be displayed to the first display unit and the second display unit so that both the first display unit and the second display unit display the information needing to be displayed.

When the obtaining unit 202, the determining unit 203, the first transmitting unit 204, the second transmitting unit 205 and/or the processing unit is a chip, the electronic device further includes a circuit board, where the obtaining unit 202, the determining unit 203, the first transmitting unit 204, the second transmitting unit 205 and/or the processing unit are arranged on the circuit board.

The various variations and particular embodiments in the method according to the foregoing embodiments of the invention will be equally applicable to the electronic device according to this embodiment, and those skilled in the art may appreciate an implementation of the electronic device according to this embodiment from the foregoing detailed description of the display method, so a detailed description thereof will be omitted here for the sake of conciseness of the description.

One or more of the technical solutions according to the embodiments of the invention have at least the following technical effects or advantages:

When the electronic device obtains information needing to be displayed, it is determined whether the information needing to be displayed is private information, and a first determination result is generated; and when the first determination result indicates that the information needing to be displayed is private information, the information needing to be displayed is transmitted to the first display unit only so that the first display unit displays the information needing to be displayed; and when the first determination result indicates that the information needing to be displayed is not private information, the information needing to be displayed is transmitted at least to the second display unit so that the second display unit displays the information needing to be displayed. That is, when the information needing to be displayed is private information, the information needing to be displayed is transmitted to the first display unit of the electronic device only but not transmitted to the second display unit of the display device so that the private information is displayed only on the first display unit but not displayed on the second display unit, thereby addressing effectively the technical problem in the prior art that the display device connected with the electronic device displays the private information directly, which may result in leakage of the private information, and enhancing the security in displaying on the display device the information needing to be displayed, which in the electronic device.

Furthermore since the electronic device and the display device can be connected wirelessly, this connection mode is not limited by a connection wire and the use range is extended.

Still furthermore, since whether information needing to be displayed is private information can be determined under an adaptive criterion according to the type of the information needing to be displayed, for example, interactive information or local information, the use range can be further extended.

Particularly, when the information needing to be displayed is information transmitted from a third electronic device connected with the electronic device, for example, interactive information, the determination of whether the information needing to be displayed is private information includes one or any combination of: determining whether a contact of the information needing to be displayed is in a predetermined database of private contacts; determining whether a reception time of the information needing to be displayed is in a first predetermined range of time; and determining whether the information needing to be displayed is information displayed by an application in a predetermined list, so that when the information needing to be displayed is interactive information, the determination of whether the information needing to be displayed is private information can be diversified to further extend the use range.

Particularly, when the information needing to be displayed is information stored in the electronic device, for example, local information, the determination of whether the information needing to be displayed is private information includes one or any combination of: determining whether a creation time of the information needing to be displayed is in a second predetermined range of time; and determining whether the information needing to be displayed is alert information, so that when the information needing to be displayed is local information, the determination of whether the information needing to be displayed is private information can be diversified to further extend the use range.

Still furthermore, since the operation to be performed in determination of whether the information needing to be displayed is private information can be updated at a predetermined period, the operation of determining whether the information needing to be displayed is private information can be updated in real-time to enhance the accuracy of determining the private information.

Still furthermore, when the first determining result indicates that the information needing to be displayed is not the private information, the information needing to be displayed can be transmitted to the second display unit, or the information needing to be displayed can be transmitted to the first display unit and the second display unit, so that the information needing to be displayed can be displayed only on the second display unit of the display device alone or can be displayed on both the first display unit of the electronic device and the second display unit of the display device. Therefore, when the information needing to be displayed is not private information, the display of the information needing to be displayed can be diversified to still further extend the use range.

Those skilled in the art shall appreciate that the embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a magnetic disk memory, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Obviously, those skilled in the art may make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A display method, applicable to an electronic device, wherein the electronic device is capable of transmitting data to a display device, the electronic device comprising a first display unit and the display device comprising a second display unit; the method comprising:
   receiving, by the electronic device, an instruction from a user, wherein the instruction indicates to synchronously display information displayed on an entire first display unit on both the first display unit and the second display unit;
   in a case that a portion of the information displayed on the entire first display unit is information transmitted from a third electronic device using an application, determining, by the electronic device, whether the application is an application in a predetermined list;
   in response to determining that the application is an application in the predetermined list, determining that the portion of the information is private information; and
   in response to determining that a portion of the information is private information, transmitting, by the electronic device, the portion of the information to the first display unit and not transmitting the portion of the information to the second display unit, despite receiving the instruction to synchronously display information displayed on the entire first display unit, including the portion of the information determined to be private information, on both the first display unit and the second display unit; and
   updating the determining operation to determine whether a portion of the information is private information.

2. The display method according to claim 1, wherein the method further comprises:
   in response to determine that a portion of the information is not private information, transmitting, by the electronic device, the portion of the information to both the first display unit and the second display unit.

3. An electronic device, wherein the electronic device comprises a processor and a non-transitory storage medium having a plurality of instructions stored thereon that, when executed by the processor, cause the processor to:
   receive an instruction from a user, wherein the instruction indicates to synchronously display information displayed on an entire first display unit on both the first display unit and a second display unit of a display device;
   obtain the information to be displayed;
   in a case that a portion of the information displayed on the entire first display unit is information transmitted from a third electronic device using an application, determine whether the application is an application in a predetermined list;
   in response to determining that the application is an application in the predetermined list, determine that the portion of the information is private information;
   in response to determining that a portion of the information is private information, transmit the portion of the information to the first display unit and not transmit the portion of the information to the second display unit, despite receiving the instruction to synchronously display information displayed on the entire first display unit, including the portion of the information determined to be private information, on both the first display unit and the second display unit; and
   update the determining operation to determine whether a portion of the information is private information.

4. The electronic device according to claim 3, wherein the instructions further cause the processor to, in response to determine that a portion of the information is not private information, transmit the portion of the information to both the first display unit and the second display unit.

5. The method according to claim 1, wherein the updating of the determining operation is performed periodically to enhance an accuracy of the determining operation.

6. The electronic device according to claim 3, wherein the instructions further cause the processor to periodically update the determining operation to enhance an accuracy of the determining operation.

7. A display method, applicable to an electronic device, wherein the electronic device is capable of transmitting data to a display device, the electronic device comprising a first display unit and the display device comprising a second display unit; the method comprising:
   receiving, by the electronic device, an instruction from a user, wherein the instruction indicates to synchronously display information displayed on an entire first display unit on both the first display unit and the second display unit;
   determining, by the electronic device, whether a portion of the information is private information by determining whether the portion of the information is alert information in a case that the information is information stored in the electronic device; and
   in response to determining that a portion of the information is private information, transmitting, by the electronic device, the portion of the information to the first display unit and not transmitting the portion of the information to the second display unit, despite receiving the instruction to synchronously display information displayed on the entire first display unit, including the portion of the information determined to be private information, on both the first display unit and the second display unit; and
   updating the determining operation to determine whether a portion of the information is private information.

8. The display method according to claim 7, further comprising, in response to determining that a portion of the information is not private information, transmitting, by the electronic device, the portion of the information to both the first display unit and the second display unit.

* * * * *